United States Patent Office 3,698,955
Patented Oct. 17, 1972

3,698,955
OXYGEN-RESPONSIVE ELECTRICAL CURRENT SUPPLY
Arnys Clifton Lilly, Jr., and Calvin O. Tiller, Richmond, Va., assignors to Philip Morris Incorporated, New York, N.Y.
Continuation-in-part of abandoned application Ser. No. 878,287, Nov. 20, 1969. This application June 15, 1970, Ser. No. 46,158
Int. Cl. G01n 27/00; H01m 11/00
U.S. Cl. 136—83 R                 10 Claims

ABSTRACT OF THE DISCLOSURE

A supply providing electrical current in accordance with both load resistance and environmental oxygen concentration incorporates an electrochemical cell having an anode, a cathode and an electrolyte composed of a rare earth fluoride. A rugged miniature supply adapted for use in space-limited applications is provided by thin film deposition of the cell elements.

---

This application is a continuation-in-part of copending application Ser. No. 878,287, filed on Nov. 20, 1969, now abandoned.

FIELD OF THE INVENTION

This invention relates to solid state cells for supplying electrical current and more particularly to solid state cells which are adaptively responsive to both loading and environmental oxygen concentration in supplying electrical current.

BACKGROUND OF THE INVENTION

In various research applications there exists a present need for an electrical current supply of minute physical dimensions and providing quite limited power. For example, in biomedical electronics, it is presently contemplated to provide electrical current supplies in direct intravenous placement, i.e. "inter vivos" supplies. It is likewise under current consideration to provide inter vivos supplies whose performance characteristics are enhanced by rendering same adaptively responsive to the ambient environment, i.e. to oxygen carried by the blood.

Whereas presently-known electrochemical cells have performance characteristics akin to certain of the foregoing desired characteristics, e.g., aqueous electrolyte electrochemical cells which sense oxygen by producing an output current varying in accordance with environmental oxygen concentration, such devices are of extensive physical size and themselves require associated external power supplies. Typical of such oxygen sensors is that disclosed in U.S. Pat. No. 2,913,386 issued to L. C. Clark, Jr. on Nov. 17, 1959, wherein spaced electrodes, disposed in contact with a thin liquid film of electrolyte, are connected to an external power supply providing a specified interelectrode potential difference. A current-monitoring meter, in series circuit with the cell and supply, indicates ambient oxygen concentration. By virtue of the relatively large "minimum" size of the sensor, i.e. a cylinder one-half inch in diameter and four to five inches in length, this prior art device does not lend itself to the subject applications. Moreover, by reason of its dependency on external power, and its limited capability of supply current to a metering unit, this device is clearly not adapted to perform as desired in the subject applications. Furthermore, since liquid electrolytes are employed in these prior art devices, they are susceptible to performance variations upon environmental aberrations such as shock, vibration and puncture, such performance variation being undesired in the applications of present interest.

SUMMARY OF THE INVENTION

It is an object of the present invention to provide an environment-adaptive electrochemical cell for use in applications requiring electrical current supplies of minute dimensions and low output power.

It is a further object of the present invention to provide a solid state electrical current supply having output power related to loading and environmental oxygen concentration.

In the efficient attainment of the foregoing and other objects there is provided in the present invention an electrical current supply comprising an electrochemical cell having an anode of a metal forming stable fluorides and oxides, a cathode and an electrolyte comprised of a rare earth fluoride. The anode and cathode metals are so displaced in the electromotive series as to have work functions providing a potential difference of at least 0.2 volt therebetween and thus render the cell operative without need for an associated external power supply. As is discussed in detail below, supplies constructed in accordance with the invention and loaded with constant resistance exhibit output power of magnitude related to environmental oxygen concentration.

Cells in accordance with the invention are preferably constructed by depositing anodic, electrolytic and cathodic films on a supporting substrate. Application of such solid state thin film technology to the present field, enabled by determination of suitable electrochemical cell constituents for providing output current with reliable and sensitive response to oxygen environments, permits the economical mass production cells of minute physical dimensions.

The above objects and other features of the invention will be evident from the following detailed description of the invention and the several illustrative embodiments shown in the drawings.

DESCRIPTION OF THE PREFERRED EMBODIMENTS

Figure 1:
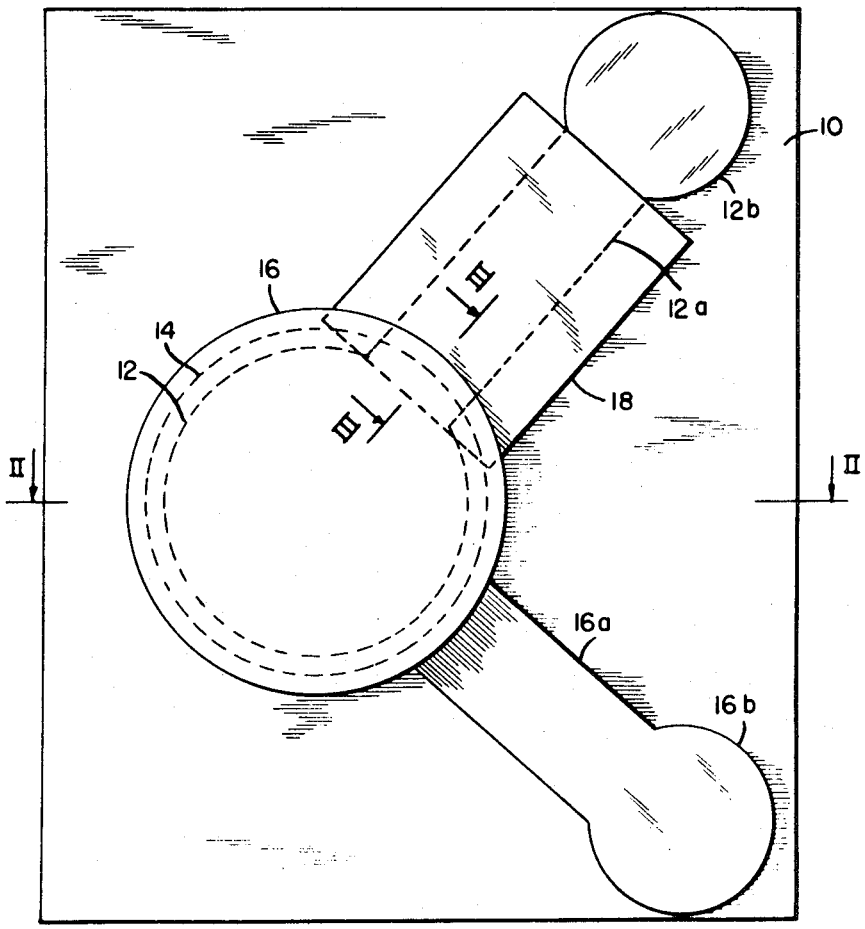
FIG. 1 is a plan view of a preferred embodiment of the current supply of the invention.

In order to enable a clear understanding of the current supply of the present invention, it will be helpful initially to discuss the character of its electrochemical cell. A basic characteristic of the electrochemical cell is that it exhibits varying current conduction in accordance with both load resistance and the concentration of oxygen in the cell electrolyte. By this characteritsics, the supply will provide increased output current to the same load as environmental oxygen concentration increases and will, in effect, provide greater output power in applications involving high ambient oxygen concentration. Exemplary supply operation, discussed hereinafter, indicates this supply characteristic in practice, and it appears that a decrease in effective internal cell resistance by oxygenation is the phenomenon responsible for this characteristic.

Such oxygen sensitivity requires that the cell be operative upon ingress therein of oxygen to provide and electrolytically conduct the various resulting anions of oxygen, e.g. $O_2^-$. In general, solid electrolytes exhibit relatively minute dissociation, and numerous solid electrolytes exist which have lattice structure characteristics providing substantially no mobility to said oxygen anions. Apart from this electrolyte lattice structure characteristic on which electrolytic conductivity is dependent, there remains the chemical compatibility characteristic, i.e. the conversion of mobile oxygen anions.

By initial determination of these requisite cell characteristics, applicants have determined certain fundamental relations requisite for high performance solid state cells adaptively responsive to ambient oxygen in supplying electrical current. The electrolyte thereof is definable in part as having a characteristically high anionic conductivity at room temperature for solid state substances. Further, such anionic conductivity must accommodate anions of size comparable to that of oxygen anions. A relatively high dielectric constant is also desired to accommodate electron capture by oxygen.

Applicants have found that the rare earth fluorides, i.e. the fluorides of scandium, yttrium, lanthanum and of the metals of the lanthanide series (atomic numbers 58 through 71), e.g. cerium, praseodymium, neodymium and erbium, exhibit to a uniquely high degree such characteristics determined necessary for solid state cells adaptively responsive to ambient oxygen in supplying electrical current.

In anionic conductivity, these compounds exhibit a conductivity of $10^{-7}$ mho/cm. $10^{-6}$ mho/cm. Further, the rare earth fluorides exhibit a large density of Schottky defects, i.e. crystalline lattice vacancies created by the removal of an ion from its normal site and placed same on or near the crystal surface. At room temperature, in excess of $10^{19}$ fluorine vacancies per cm.$^3$ are provided, the vacancies being sufficient in size to provide mobility for the relatively large oxygen anions. Finally, the dielectric constants thereof have been found to accommodate electron capture by oxygen.

The requirements for the electrodes of current supplies constructed in accordance with the invention will be evident from a consideration of the presumed electrochemical reactions therein. In a preferred current supply of the invention, a lanthanum fluoride electrolytic film is employed in conjunction with a bismuth anode and a gold cathode. In the absence of oxygen, these cell reactions are presumed:

In the electrolyte:

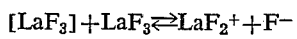

At the anode:

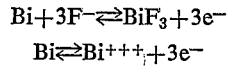

The lanthanum difluoride cation is substantially immobile, and the gold cathode merely provides electrons. A theoretical open circuit interelectrode voltage of 0.57 volt is calculated from the electromotive series. Upon the presence of oxygen in the cell electrolyte, the cell reactions are presumed to be, in addition to the above:

At the cathode:

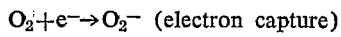

At the anode:

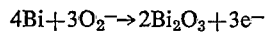

The electrode requirements are evidently that the cell anode form stable fluorides and oxides and that the cell cathode be an inert conductor. Furthermore, the anode-cathode metal combinations are selected by reference to the electro-motive series, such that the differences in the work functions of these electrodes (open circuit) will provide the interelectrode potential difference of at least the 0.2 volt required for electron capture by oxygen. Thus, examples of various metals which are usable as cell electrodes, include for the cathode—gold, platinum, rhodium, and palladium, and for the anode—silver, zinc, bismuth, beryllium, cadmium, rubidium, lanthanum, iron, and lead. Usable anode-cathode metal combinations other than bismuth-gold are, typically, lanthanum-gold lanthanum-rhodium, beryllium-platinum, etc.

While the above reactions presume the absence of water vapor, experimental results show that same does not affect cell sensitivity to oxygen.

Figure 3:
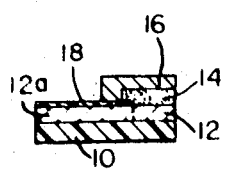
FIG. 3 is a partial sectional view taken along the line III—III of FIG. 1.
Figure 2:
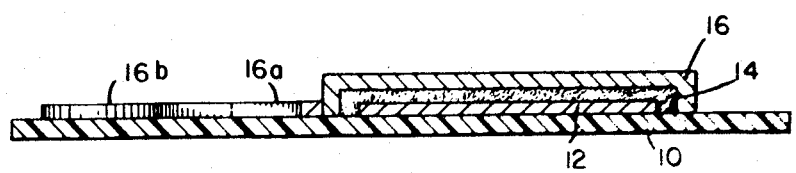
FIG. 2 is a sectional view taken along the line II—II of FIG. 1.

Referring to FIGS. 1, 2 and 3, a preferred structural arrangement of the current supply comprises an insulative support member 10, suitably comprised of glass or ceramic, a thin film of anodic metal 12 overlying said support member, a thin film of solid electrolyte 14 overlying said anodic film and said support member, and a thin film of cathodic metal 16 overlying said electrolyte and said support member.

In this arrangement cell elements 12, 14, and 16 are substantially circular films concentrically disposed relative to the center of the supply. Film 14 is in contiguous electrical contact with films 12 and 16 and is in separating relation thereto. Thus all conductivity between anodic film 12 and cathodic film 16 occurs through electrolyte film 14. While these films are all in further contacting relation to support member 10, since this member is insulative no interfilm conductivity is provided thereby.

Anodic film 12 includes a strip portion 12a extending through films 14 and 16 (FIG. 3) to the exterior of the supply, said strip terminating in anode pad 12b by which electrical connection may be made to the anodic film. To preserve cell geometry as respects anode-cathode conductivity through electrolyte film 14, and to prevent direct short-circuiting of films 12 and 16, an insulative layer 18 is arranged in overlying relation to anodic film strip portion 12a and support member 10 to enclose strip portion 12a and electrically insulate same from films 14 and 16.

Electrical connection is made to cathodic film 16 through strip portion 16a and pad 16b. As strip portion 16a extends exteriorly of the supply, same contacts only insulative support member 10. Since no contact is made with underlying enclosed films 12 and 14, no insulative member need be employed in conjunction with strip portion 16a.

In manufacture of the supply illustrated in FIGS. 1–3, the various films are deposited in vacuum through appropriate masks onto support member 10. Typically a glazed alumina sheet, "Alsimag" 614 (American Lava Corp.), 1/32 inch in thickness with a 743 glaze of borosilicate, is loaded into a vacuum deposition chamber together with evaporation boats each containing material for one of the supply films. The support member is selectively positioned in target positions above the respective material-containing boats by a turntable or carousel. Evaporation masks are supported between the boats and targets on a second carousel which can be raised to bring a mask into contact with the support member. The chamber is evacuated by means of an ion absorption pump to 2.5 to $10^{-8}$ torr and pressure is maintained throughout the deposition process at 2 to 4 times $10^{-7}$ torr. The support member is heated to in excess of 125° C. to remove water and other absorbed contaminants. Thereupon the anodic film evaporation mask is raised against the support member and the anodic film material body is moved into registration with the substrate and mask. The body is then heated with current flow predetermined to give sufficiently rapid deposition, the rate of deposition of each material being selected to insure a smooth and even layer.

Upon completion of deposition of the anodic film, the evaporation boat containing the material constituting insulative film 18 is moved into target position and the evaporation mask corresponding to desired insulative film geometry is raised against the aniodic-filmed support member. Thereupon film 18 is deposited over the limited anodic film area illustrated in FIG. 1.

Upon completion of deposition of insulative film 18 upon the support member and anodic film 12, the evaporation boat containing electrolyte film material is moved into the target position and the electrolyte film evaporation mask is raised against the support member in place of the aniodic mask and deposition of this film ensues. As particularly illustrated in FIG. 3, the deposited electrolyte film is spaced at a limited portion of the circular periphery thereof from anodic film 12 by insulative layer 18. Substrate temperature is maintained at approximately 125° C. and evaporation is maintained at a relatively slow rate. Such method parameters provide for a reduced number of grain boundaries, low internal electrolyte resistance and avoidance of amorphous electrolyte structure.

Depositon of cathodic film 16 is next performed by movement of the cathodic film material evaporation body and evaporation mask into the target position. As illustrated in FIG. 1, the cathodic film mask defines strip portion 16a and pad 16b in addition to the interior circular cathodic film proper. As illustrated in FIG. 2, the strip pad portions 16a and 16b are deposited directly upon support member 10 whereas all remaining portions of the cathodic film are deposited upon electrolyte film 14 and insulative layer 18 (FIG. 3).

In the supply of FIGS. 1–3 oxygen must permeate film 16 in order to gain access to electrolyte film 14 for modification of cell conductivity. Thus cathodic film 16 must be oxygen-permeable in this arrangement. No substantial difficulty is involved in this requirement since, by suitable control of film geometry and deposition parameters, a high degree of oxygen permeability is provided. Thus, the cathodic material is deposited in minute islands to form a composite film having porosity to oxygen molecules. In use of the current supply, an external load circuit is connected to terminal pads 12b and 16b.

As is customary in vacuum deposition of metallic layers onto glass or ceramic substrates it is within the contemplation of the invention to incorporate film underlays providing anchorage for the deposited films. For example, selective deposition of a thin film of chromium on support member 10 prior to the above-described deposition process is within the purview of the invention. The invention also contemplates the step of subjecting the electrolyte film to X-ray treatment to increase Shcottky defects and the introduction of excess fluorine ion vacancies in the electrolyte, as by doping the electrolyte with a divalent metal fluoride, where greater oxygen sensitivity is desired.

As an alternate arrangement to that illustrated in FIGS. 1–3, the supply anodic and cathodic films may be deposited in spaced coplanar relation on the support member and the electrolyte film deposited on and in the space between the anodic and cathodic films. In either arrangement, an oxygen-permeable supply container may be employed either to protect the supply from environmental contaminants or to protect the environment from contamination by the supply, e.g. a strile casing for inter vivos applications.

Example 1

A current supply having the structure of FIGS. 1–3 is constructed by employing "Alsimag" 614 glazed alumina sheet, bismuth anodic film material, lanthanum fluoride electrolyte film material and gold cathodic film material. The respective film thicknesses are: 4320 A., 8635 A., and 2015 A.

An open circuit voltage of one-half volt is measured between anodic film pad 12b and cathodic film pad 16b. Upon connection of a load resistance of $1.0 \times 10^9$ ohms to the film pads, with environmental oxygen concentration at zero percent oxygen (pure nitrogen atmosphere), an output voltage of 0.15 volt is provided, indicating a load current of $1.5 \times 10^{-10}$ amp.

When the supply is subjected to an environmental oxygen concentration of twenty-one percent and the same load resistance, an output voltage of 0.4 volt is provided, indicating load current to be $0.4 \times 10^{-9}$ amp., or almost three times the load current supplied under zero percent environmental oxygen concentration. With constant loading for twelve hours, a decrease in ouput voltage of 0.018 volt is observed.

Figure 4:
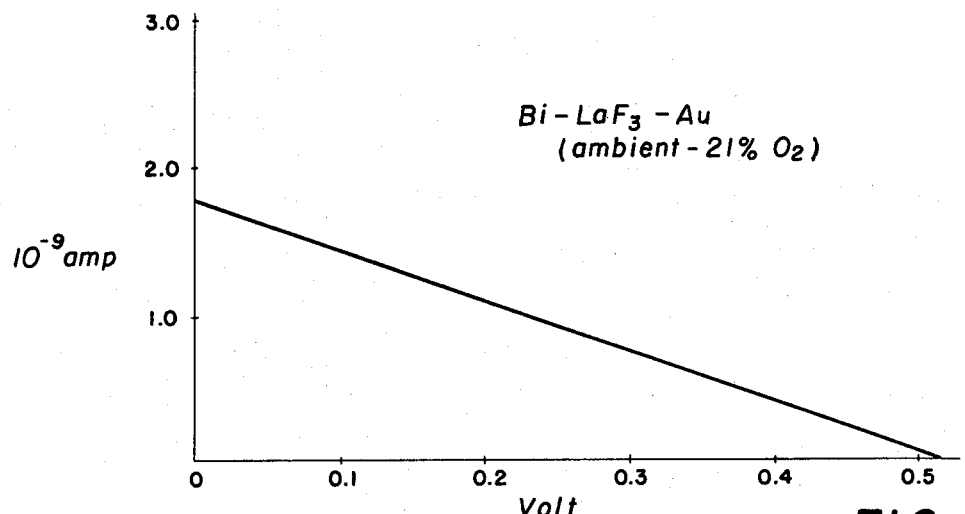
FIGS. 4, 5 and 6 are graphical illustrations of performance characteristics of current supplies in accordance with the invention.

Performance characteristics of this cell are shown in FIG. 4, wherein the relationship between terminal voltage of the supply and output current is indicated as the load resistance is varied from $10^{10}$ to zero ohms, while the supply is maintained in an environment having a constant twenty-one percent oxygen concentration. From this plot, the effective internal resistance of the supply may be seen to be aproximately $2.8 \times 10^8$ ohms, and it will be noted that the supply is self-limiting as respects maximum allowable output current. Thus, at an output current of about $1.8 \times 10^{-9}$ amp., output voltage falls to zero. Such self-limiting characteristic is of particular importance in applications within the purview of the invention, i.e. biomedical electroncs, wherein it may be desired to have a current supply which is adapted to discontinue current supplying above a predetermined maximum current level without the need for current regulating apparatus.

Example 2

A current supply having the structure of FIGS. 1–3 is constructed by employing "Alsimag" 614 glazed alumina sheet, bismuth anodic film material, praseodymium fluoride electrolyte film material and gold cathodic film material. The respective film thicknesses are: 3174 A., 2744 A., and 804 A.

An open circuit voltage of one-half volt is measured between anodic film pad 12b and cathodic film pad 16b. Upon connection of a load resistance of $1.0 \times 10^9$ ohms to the film pads, with environmental oxygen concentration at zero percent oxygen (pure nitrogen atmosphere), an output voltage of 0.25 volt is provided, indicating a load current of $2.5 \times 10^{-10}$ amp.

When the supply is subjected to an environmental oxygen concentration of twenty-one percent and the same load resistance, an output voltage of 0.37 volt is provided, indicating load current to be $0.37 \times 10^{-9}$ amp., or about one and one-half times the load current supplied under zero percent environmental oxygen concentration. With constant loading for twelve hours, a decrease in output voltage of 0.027 volt is observed.

Figure 5:
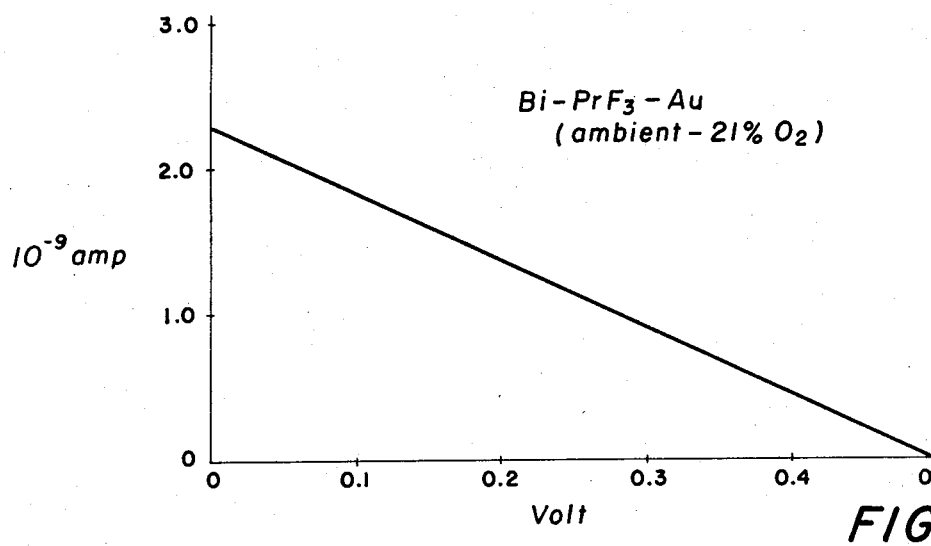

Performance characteristics of this cell are shown in FIG. 5, wherein the relationship between terminal voltage of the supply and output current is indicated as the load resistance is varied from $10^{10}$ to zero ohms, while the supply is maintained in an environment having a constant twenty-one percent oxygen concentration. From this plot, the effective internal resistance of the supply may be seen to be approximately $2.0 \times 10^8$ ohms, and it will be noted that the supply is self-limiting as respects maximum allowable output current. Thus, at an output current of about $2.2 \times 10^{-9}$ amp., output voltage falls to zero.

Example 3

A current supply having the structure of FIGS. 1–3 is constructed by employing "Alsimag" 614 glazed alumina sheet, bismuth anodic film material, neodymium fluoride electrolyte film material and gold cathodic film material. The respective film thicknesses are: 2200 A., 2598 A., and 878 A.

An open circuit voltage of one-half volt is measured between anodic film pad 12b and cathodic film pad 16b. Upon connection of a load resistance of $1.0 \times 10^9$ ohms to the film pads, with environmental oxygen concentration at zero percent oxygen (pure nitrogen atmosphere), an output voltage of 0.27 volt is provided, indicating a load current of $2.7 \times 10^{-10}$ amp.

When the supply is subjected to an environmental oxygen concentration of twenty-one percent and the same load resistance, an output voltage of 0.40 volt is provided, indicating load current to be $0.40 \times 10^{-9}$ amp., or about one and one-half times the load current supplied under zero percent environmental oxygen concentration. With constant loading for twelve hours, a decrease in output voltage of 0.015 volt is observed.

Figure 6:
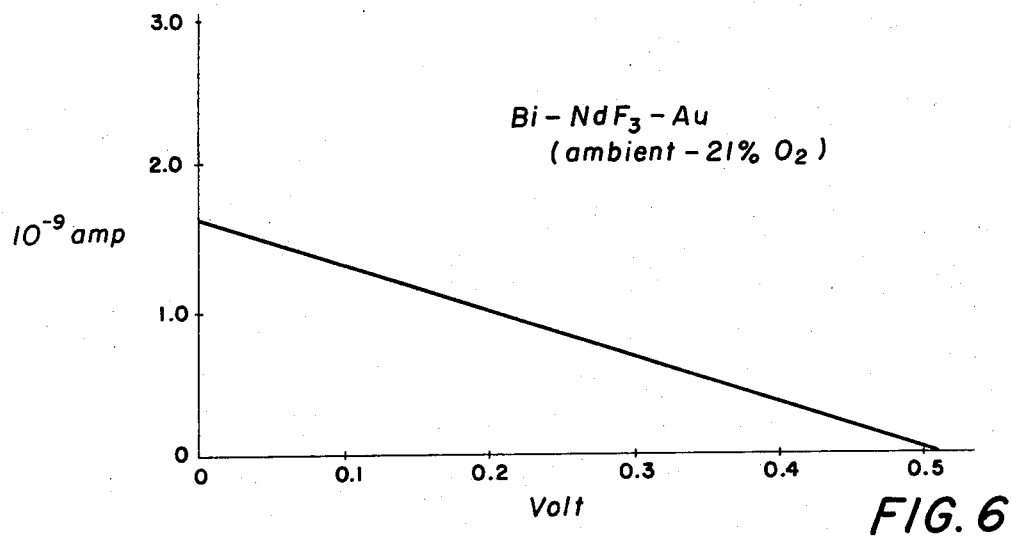

Performance characteristics of this cell are shown in FIG. 6, wherein the relationship between terminal voltage of the supply and output current is indicated as the load resistance is varied from $10^{10}$ to zero ohms, while the supply is maintained in an environment having a constant twenty-one percent oxygen concentration. From this plot, the effective internal resistance of the supply may be seen to be approximately $3.0 \times 10^8$ ohms, and it will be noted that the supply is self-limiting as respects maximum allowable output current. Thus, at an output current of about $1.6 \times 10^{-9}$ amp., output voltage falls to zero.

By reason of the above-discussed minute thicknesses for the film employed in the current supply of the invention, miniaturization and micro-miniaturization of the device is readily enabled. Thus, supplies of appropriate size demanded by such applications as heretofore discussed and various other space-limited applications may be readily constructed by solid-state filming techniques. Further, by reason of the absence of any liquid constituent susceptible to sloshing, vibration or shock-induced performance aberration, supplies constructed in accordance with the invention are readily adapted for use in rugged environments.

While the invention has been disclosed by way of the foregoing particularly preferred embodiment, various modifications thereto will be evident to those skilled in the art and thus such embodiment is intended in a descriptive and not in a limiting sense. The spirit and scope of the invention will be evident from the following claims.

What is claimed is:

1. A supply adaptively responsive to environmental oxygen in producing electrical current under load, comprising an electrochemical cell having a metallic cathode, an anode spacedly disposed with respect to said cathode and comprised of a metal dissimilar from said cathode metal and forming stable fluorides and oxides, and a solid rare earth fluoride electrolyte in contacting relation with said anode and said cathode, said anode and cathode metals having work functions providing an open-circuit potential difference of at least 0.2 volt therebetween.

2. The current supply claimed in claim 1 further including an insulative support member in contacting relation with a first surface of said anode, a first surface of said electrolyte in contacting relation with another surface of said anode, a surface of said cathode in contacting relation with another surface of said electrolyte.

3. The current supply claimed in claim 2 wherein said anode, cathode and electrolyte are thin films, said anodic and cathodic films including portions extending exteriorly to said supply.

4. The current supply claimed in claim 3 further including an insulative film in contacting relation with and partially overlying said anodic film and insulating said anodic portion from said cathodic film.

5. The current supply claimed in claim 1 wherein said electrolyte is lanthanum fluoride.

7. The current supply claimed in claim 1 wherein said electrolyte is praseodymium fluoride.

9. The current supply claimed in claim 1 wherein said electrolyte is neodymium fluoride.

6. The current supply claimed in claim 5 wherein said anode is bismuth and said cathode is gold.

8. The current supply claimed in claim 7 wherein said anode is bismuth and said cathode is gold.

10. The current supply claimed in claim 9 wherein said anode is bismuth and said cathode is gold.

References Cited

UNITED STATES PATENTS

| | | | |
|---|---|---|---|
| 3,375,420 | 3/1968 | Sher et al. | 317—258 |
| 3,261,902 | 7/1966 | Pearce et al. | 317—234 X |
| 3,318,734 | 5/1967 | McCully | 136—6 |
| 3,271,192 | 9/1966 | Thun et al. | 117—217 |

OTHER REFERENCES

A. Sher et al., physical review, vol. 144, No. 2, pp. 593–604 (1966).

GERALD L. KAPLAN, Primary Examiner

U.S. Cl. X.R.

136—153; 204—195 S

UNITED STATES PATENT OFFICE
CERTIFICATE OF CORRECTION

Patent No. 3,698,955           Dated October 17, 1972

Inventor(s) Arnys Clifton Lilly, Jr. et al.

It is certified that error appears in the above-identified patent and that said Letters Patent are hereby corrected as shown below:

Column 2, line 60, "characteritsics" should read --characteristic--.

Column 3, line 29, "placed" should read --placing--.

Column 4, line 71, "aniodic" should read --anodic--.

Column 5, line 4, "aniodic" should read --anodic--.

Column 5, line 44 "Shcottky" should read --Schottky--.

Column 5, line 57, "strile" should read --sterile--.

Column 6, line 13, "aproximately" should read --approximately--.

Column 6, line 19, "electroncs" should read --electronics--.

Column 8, line 17, "7." should read --6.--.

Column 8, line 19, "9." should read --7.--.

Column 8, line 21, "6." should read --8.--.

Column 8, line 23, "8." should read --9.--.

Column 8, line 23, "7" should read --6--.

Column 8, line 25, "9" should read --7--.

Signed and sealed this 24th day of April 1973.

(SEAL)
Attest:

EDWARD M. FLETCHER, JR.
Attesting Officer

ROBERT GOTTSCHALK
Commissioner of Patents